(12) United States Patent
Gao et al.

(10) Patent No.: US 9,156,927 B2
(45) Date of Patent: Oct. 13, 2015

(54) CATALYST COMPONENT FOR OLEFIN POLYMERIZATION REACTION AND CATALYST COMPRISING SAME

(75) Inventors: Mingzhi Gao, Beijing (CN); Changxiu Li, Beijing (CN); Haitao Liu, Beijing (CN); Xiaofan Zhang, Beijing (CN); Jianhua Chen, Beijing (CN); Jing Ma, Beijing (CN); Xiaoxia Cai, Beijing (CN); Xianzhong Li, Beijing (CN); Jixing Ma, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 376 days.

(21) Appl. No.: 13/642,851

(22) PCT Filed: Apr. 22, 2011

(86) PCT No.: PCT/CN2011/000709
§ 371 (c)(1),
(2), (4) Date: Oct. 22, 2012

(87) PCT Pub. No.: WO2011/131033
PCT Pub. Date: Oct. 27, 2011

(65) Prior Publication Data
US 2013/0041120 A1    Feb. 14, 2013

(30) Foreign Application Priority Data
Apr. 22, 2010    (CN) .......................... 2010 1 0152784

(51) Int. Cl.
| | | |
|---|---|---|
| *B01J 21/00* | (2006.01) | |
| *B01J 23/00* | (2006.01) | |
| *B01J 25/00* | (2006.01) | |
| *B01J 29/00* | (2006.01) | |
| *B01J 31/00* | (2006.01) | |
| *B01J 37/00* | (2006.01) | |
| *C08F 4/02* | (2006.01) | |
| *C08F 4/60* | (2006.01) | |
| *C08F 110/06* | (2006.01) | |

(52) U.S. Cl.
CPC ..................................... *C08F 110/06* (2013.01)

(58) Field of Classification Search
USPC .................. 502/115, 100, 102, 104
See application file for complete search history.

(56) References Cited

U.S. PATENT DOCUMENTS

| | | | |
|---|---|---|---|
| 6,197,900 B1 * | 3/2001 | Seelert et al. ................. | 526/114 |
| 6,489,411 B1 * | 12/2002 | Shamshoum et al. ........ | 526/119 |
| 2005/0187360 A1 * | 8/2005 | Blackmon et al. .......... | 526/124.3 |
| 2007/0155616 A1 * | 7/2007 | Wang et al. ................... | 502/103 |

FOREIGN PATENT DOCUMENTS

| | | |
|---|---|---|
| CN | 1453298 A | 11/2003 |
| CN | 1580034 A | 2/2005 |
| CN | 101560272 A | 10/2009 |
| CN | 101565475 A | 10/2009 |
| DE | 19927979 A1 | 10/2000 |
| EP | 1970388 A1 | 9/2008 |
| JP | 2002542347 A | 12/2002 |
| JP | 2005517746 A | 6/2005 |
| JP | 2007505955 A | 3/2007 |
| WO | 03/068723 A1 | 8/2003 |
| WO | 2009029447 A1 | 3/2009 |
| WO | 2009085649 A1 | 7/2009 |

OTHER PUBLICATIONS

Yoshio Okamoto, et al. "Chromatographic Resolution of Enantiomers Having Aromatic Group by Optically Active Poly (Triphenylmethyl Methacrylate)" Chemistry Letters. pp. 835-838 (1981).

* cited by examiner

*Primary Examiner* — James McDonough
(74) *Attorney, Agent, or Firm* — Novick, Kim & Lee, PLLC; Allen Xue

(57) ABSTRACT

A catalyst component for olefin polymerization comprising magnesium, titanium, halogen and electron donor, wherein the electron donor is selected from at least one of the diol diester compounds, when the diol diester comprised contains a certain amount of isomer with Fischer projection formula as shown in Formula (II), the activity and stereospecificity of the catalyst are greatly improved, especially in the production of polymers with high melt index, the isotactic index of the obtained polymers is improved substantially.

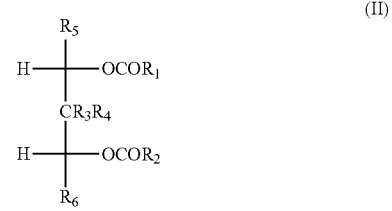

22 Claims, No Drawings

CATALYST COMPONENT FOR OLEFIN POLYMERIZATION REACTION AND CATALYST COMPRISING SAME

CROSS REFERENCE TO RELATED APPLICATIONS

This is a U.S. national stage entry of International Application No. PCT/CN2011/000709, filed on Apr. 22, 2011, which in turn claims priority to Chinese Patent Application No. 201010152784.1, filed Apr. 22, 2010, each of which is hereby incorporated by reference herein in its entirety.

TECHNICAL FIELD

The present invention relates to a solid catalyst component comprising diol diester compound with a special structure and the preparation thereof. The present invention also relates to a catalyst comprising said solid catalyst component and its use in olefin polymerization, especially in propylene polymerization.

TECHNICAL BACKGROUND

It is well known that, the solid Ti catalyst component comprising magnesium, titanium, halogen, and electron donor as basic ingredients can be used in the polymerization of olefins, and especially used in the polymerization of alpha olefins having three or more carbon atoms for obtaining polymers with a higher stereoregularity in a higher yield. Electron donor compound is one of the essential ingredients of the catalyst component. With the development of the internal electron donor compound, new catalysts for polyolefin are developed constantly. At present, a large amount of electron donor compounds have been disclosed, for instance, polycarboxylic acid, monocarboxylic ester or polycarboxylic ester, anhydride, ketone, monoether or polyether, alcohol, amine and derivatives thereof.

A kind of 1,3-diol diester compound is disclosed in CN1453298A and CN1580034A. A catalyst with excellent comprehensive properties can be obtained by using said 1,3-diol diester compound as electron donor in the catalyst for olefin polymerization,. When the catalyst is used for propylene polymerization, higher polymerization activity and higher stereospecificity can be obtained, and the molecular weight distribution of the obtained polymer is wide as well. However, the acitivity and stereospecificity of the catalyst are not satisfactory. And especially in the production of polymers with high melt index, the isotactic index of the obtained polymers is not high enough, and thus an further improvement is needed.

As to the 1,3-diol diester compound disclosed, when the four groups connected to one carbon atom are different from each other, there are two spatial connection modes for the four groups connected to the carbon atom. The two connection modes are mirror images of each other, as left hand and right hand, and can not be completely superimposed onto each other. This kind of compound is known as "chiral compound". The inventor surprisingly finds that, if the diol diester compounds as shown in Formula (I) with several conformational isomers are used as internal electron donor to prepare the catalyst, the activity and stereospecificity of the catalyst would be satisfactory only when the catalyst contains a certain amount of isomer with Fischer projection formula as shown in Formula (II). And especially in the production of polymers with high melt index, the isotactic index of the obtained polymers is increased substantially.

SUMMARY OF THE INVENTION

An object of the invention is to provide a catalyst component for olefin polymerization, comprising magnesium, titanium, halogen and electron donor, wherein the electron donor is selected from at least one of the diol diester compounds as shown in Formula (I), and in said diol diester compounds as shown in Formula (I), the content of the diol diester compound with Fischer projection formula as shown in Formula (II) is greater than or equal to 35 wt %:

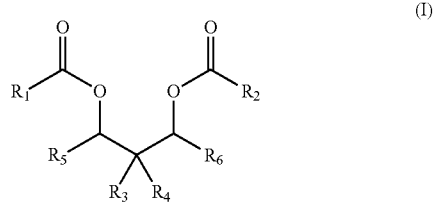

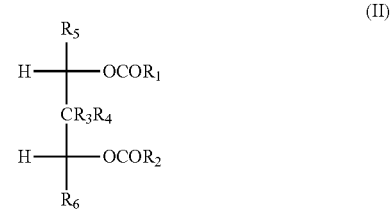

in both of Formula (I) and Formula (II):

$R_1$ and $R_2$, which may be identical to or different from each other, can be ($C_3$~$C_{20}$)cycloalkyl, ($C_6$~$C_{20}$)aryl or ($C_7$~$C_{20}$)alkaryl or aralkyl group, and the hydrogen atom bound to the carbon atom in said cycloalkyl, aryl, alkaryl or aralkyl group can be optionally substituted by halogen atom, but $R_1$ and $R_2$ can not be ($C_3$~$C_{20}$)cycloalkyl simultaneously;

$R_3$ and $R_4$, which may be identical to or different from each other, can be hydrogen atom, halogen atom, ($C_1$~$C_{10}$) straight chain alkyl, ($C_3$~$C_{10}$) branched chain alkyl, ($C_3$~$C_{10}$)cycloalkyl, ($C_6$~$C_{10}$)aryl or ($C_7$~$C_{10}$)alkaryl or aralkyl group, and $R_3$ and $R_4$ can be optionally bonded together to form ring; and $R_5$ and $R_6$, which may be identical to or different from each other, can be halogen atom, ($C_1$~$C_{10}$) straight chain alkyl, ($C_3$~$C_{10}$) branched chain alkyl, ($C_3$~$C_{10}$)cycloalkyl, ($C_6$~$C_{10}$)aryl or ($C_7$~$C_{10}$)alkaryl or aralkyl, and the hydrogen atom bound to the carbon atom in said alkyl, aryl, alkaryl or aralkyl can be optionally substituted by halogen atom.

As to synthesis of the compounds having chiral carbon atom, especially more than two chiral carbon atoms, unless a special method is used, the synthesized compounds are generally a mixture of several conformational isomers, comprising levo isomer, dextro isomer, symmetric compound and mesomer, wherein the mixture of levo isomer and dextro isomer with the same amount is racemate. Due to different synthesis processes or conditions, the contents of the conformational isomers obtained are different. The reaction binding ability between different conformational isomers and magnesium compound and/or titanium compound is different. Thus in the preparation of catalyst, even in the case of one single kind of diol diester compound is used and the amount thereof is the same, the properties of the final catalyst will be very different from each other due to different contents of each conformational isomer.

In the present invention, the Fischer projection formula and its naming are determined according to the rules set forth in Pages 40-44 of "*System Organic Chemistry*" authored by YANG Fengke, LI Ming and LI Fengqi. The principles are as follows: a cross represents the three-dimension skeletal structure of molecule, in which the center of the cross is the chiral carbon atom, the vertical bond extends toward the back of the sheet plane, and the transverse bond extends toward the front of the sheet plane; the Fischer projection formula cannot rotate freely, and the configuration will be changed if the Fischer projection formula rotates 90°, but unchanged if it rotates 180°; and any two groups of the chiral carbon cannot exchange with each other freely, and the configuration will be changed if they exchange once, but unchanged if exchange twice.

The binding ability between different conformational isomers of one single compound and magnesium compound or titanium compound is different, and the distance between the atoms of different conformational isomers to be bound with magnesium or titanium is different. It is surprisingly found that when the diol diester compound as shown in Formula (I) is used as electron donor to prepare a catalyst component for olefin polymerization, the binding ability between the diol diester with Fischer projection formula as shown in Formula (II) and magnesium compound and/or titanium compound and the distance between the atoms of said diol diester to be bound with magnesium or titanium are the most suitable, and the comprehensive properties of the obtained catalyst are also the best. Therefore, the higher the content of the diol diester compound with Fischer projection formula as shown in Formula (II) is, the better the comprehensive properties of the catalyst are, and the higher activity and stereospecificity of the catalyst are. Meanwhile, the isotactic index of the obtained polymers is higher especially in the production of polymers with high melt index, so that the mechanical property, especially strength etc., of the obtained polymer will be further increased. The catalyst is suitable to produce the polymers that are required to have an even higher strength. In the present invention, different synthetic methods are used to synthesize the levo isomer, dextro isomer and mesomer (in the following, meso refers to mesomer, i.e. $R_1=R_2$ and $R_5=R_6$ in the Fisher projection formula (II)), and said compound is added according to different proportions in the preparation of the catalyst, so that the content of the compound with Fisher projection formula (II) can meet the experimental requirements. If the diol diester as shown in formula (I) is used as electron donor to prepare said catalyst component for olefin polymerization, only when the content of the diol diester compound with Fischer projection formula as shown in Formula (II) is greater than or equal to 35 wt %, the activity and stereotactic ability of the catalyst could be higher, and especially in the production of polymers with high melt index, the isotactic index indicated by boiling n-heptane extracted insolubles could be enhanced significantly, and thus the catalyst can be used to produce polymers with high melt index, high isotactic index and high strength. In order to further improve the activity and stereotactic ability of the catalyst, in the present invention the content of the diol diester compound with Fischer projection formula as shown in Formula (II) is preferably greater than or equal to 51 wt %, further preferably greater than or equal to 60 wt %, and even further preferably greater than or equal to 80 wt %.

In Formulas (I) and (II): $R_1$ and $R_2$ groups are preferably selected from phenyl, halogenated phenyl, alkyl phenyl, halogenated alkyl phenyl, indenyl, benzyl and phenethyl group; $R_3$ and $R_4$ groups are preferably selected from hydrogen, chloro, bromo, methyl, ethyl, propyl, isopropyl, butyl and isobutyl group; $R_5$ and $R_6$ groups are preferably selected from methyl, ethyl, propyl, isopropyl, butyl and isobutyl group.

Further preferably, at least one of $R_1$ and $R_2$ groups is selected from phenyl, halogenated phenyl, $(C_1-C_5)$alkyl phenyl, and $(C_1-C_5)$ halogenated alkyl phenyl group.

Even further preferably, $R_1$ group is the same as $R_2$ group.

For said diol diester according to the present invention, some specific examples of the diol diester compounds with Fisher projection formula as shown in Formula (II) can be selected from, but not limited to, the followings:
meso-2,4-pentanediol dibenzoate,
meso-3-methyl-2,4-pentanediol dibenzoate,
meso-3-ethyl-2,4-pentanediol dibenzoate,
meso-3-propyl-2,4-pentanediol dibenzoate,
meso-3-butyl-2,4-pentanediol dibenzoate,
meso-3,3-dimethyl-2,4-pentanediol dibenzoate,
meso-2,4-pentanediol di(p-methylbenzoate),
meso-3-chloro-2,4-pentanediol dibenzoate,
meso-3-bromo-2,4-pentanediol dibenzoate,
meso-2,4-pentanediol di(m-methylbenzoate),
meso-2,4-pentanediol di(o-methylbenzoate),
meso-2,4-pentanediol di(p-ethylbenzoate),
meso-2,4-pentanediol di(p-butylbenzoate),
meso-2,4-pentanediol di(p-chlorobenzoate),
meso-3,5-heptanediol dibenzoate,
meso-4-methyl-3,5-heptanediol dibenzoate,
meso-4-dimethyl-3,5-heptanediol dibenzoate,
meso-4-ethyl-3,5-heptanediol dibenzoate,
meso-4-propyl-3,5-heptanediol dibenzoate,
meso-4-butyl-3,5-heptanediol dibenzoate,
meso-4-chloro-3,5-heptanediol dibenzoate,
meso-4-bromo-3,5-heptanediol dibenzoate,
meso-3,5-heptanediol di(p-methylbenzoate),
meso-3,5-heptanediol di(o-methylbenzoate),
meso-3,5-heptanediol di(m-methylbenzoate),
meso-3,5-heptanediol di(p-ethylbenzoate),
meso-3,5-heptanediol di(p-butylbenzoate),
meso-3,5-heptanediol di(p-chlorobenzoate),
(2S,4R)-2,4-pentanediol benzoxy cinnamate,
(2S,4R)-3-methyl-2,4-pentanediol benzoxy cinnamate,
(2S,4R)-3-ethyl-2,4-pentanediol benzoxy cinnamate, (2S,4R)-3-propyl-2,4-pentanediol benzoxy cinnamate, (2S,4R)-3-butyl-2,4-pentanediol benzoxy cinnamate,
(2S,4R)-3,3-dimethyl-2,4-pentanediol benzoxy cinnamate,
(2S,4R)-3-chloro-2,4-pentanediol dibenzoate,
(3S,5R)-3,5-heptanediol benzoxy cinnamate,
(3S,5R)-4-methyl-3,5-heptanediol benzoxy cinnamate,
(3S,5R)-4,4-dimethyl-3,5-heptanediol benzoxy cinnamate,
(3S,5R)-4-ethyl-3,5-heptanediol benzoxy cinnamate,
(3S,5R)-4-propyl-3,5-heptanediol benzoxy cinnamate, (3S,5R)-4-butyl-3,5-heptanediol benzoxy cinnamate, (3S,5R)-4-chloro-3,5-heptanediol benzoxy cinnamate,
(2S,4R)-6-methyl-2,4-heptanediol dibenzoate,
(2S,4R)-6-methyl-2,4-heptanediol di(p-butyl benzoate),
(2R,4S)-2,4-pentanediol benzoxy cinnamate,
(2R,4S)-3-methyl-2,4-pentanediol benzoxy cinnamate, (2R,4S)-3-ethyl-2,4-pentanediol benzoxy cinnamate,
(2R,4S)-3-propyl-2,4-pentanediol benzoxy cinnamate, (2R,4S)-3-butyl-2,4-pentanediol benzoxy cinnamate, (2R,4S)-3,3-dimethyl-2,4-pentanediol benzoxy cinnamate,
(2R,4S)-3-chloro-2,4-pentanediol dibenzoate,
(3R,5S)-3,5-heptanediol benzoxy cinnamate,
(3R,5S)-4-methyl-3,5-heptanediol benzoxy cinnamate, (3R,5S)-4,4-dimethyl-3,5-heptanediol benzoxy cinnamate, (3R,5S)-4-ethyl-3,5-heptanediol benzoxy cinnamate, (3R,5S)-4-propyl-3,5-heptanediol benzoxy cinnamate, (3R,5S)-4-butyl-3,5-heptanediol benzoxy cinnamate, (3R,5S)-4-chloro-3,5-heptanediol benzoxy cinnamate, (2R,4S)-6-methyl-2,4-heptanediol dibenzoate, (2R,4S)-6-methyl-2,4-heptanediol di(p-butyl benzoate), and so on.

In the catalyst component used for olefin polymerization according to the present invention, said electron donor diol diester compound is marked as "a", and the catalyst component further includes electron donor "b", wherein "b" is phthalate diester compound or diether compound as shown in Formula (III), and the molar ratio of "a" to "b" is from 1:0.01 to 1:100, further preferably from 1:0.02 to 1:5,

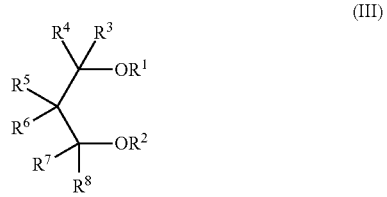

(III)

in Formula (III), $R^1$ and $R^2$, which may be identical to or different from each other, can be selected from straight chain or branched chain $(C_1-C_{20})$alkyl and $(C_3-C_{20})$cycloalkyl group; $R^3-R^8$, which may be identical to or different from each other, can be selected from hydrogen atom, halogen atom, straight chain or branched chain $(C_1-C_{20})$alkyl, $(C_3-C_{20})$cycloalkyl, $(C_6-C_{20})$aryl and $(C_7-C_{20})$aralkyl group, and the $R^3-R^8$ groups can be optionally bonded together to form ring.

Because the catalyst component contains a certain amount of diol diester compound with Fischer projection formula as shown in Formula (II), the activity of the catalyst and the isotacticity of the polymer have been improved significantly.

According to the present invention, said catalyst component used for olefin polymerization is preferably obtained by the reaction of magnesium compound and titanium compound with said diol diester compound as defined above. The Formula of titanium compound is $TiX_n(OR)_{4-n}$, wherein R is hydrocarbyl group having 1 to 20 carbon atoms, X is halogen, and n is a value satisfying $0 \leq n \leq 4$. For example, it can be titanium tetrachloride, titanium tetrabromide, titanium tetraiodide, tetrabutoxy titanium, tetraethoxy titanium, triethoxy titanium chloride, diethoxy titanium dichloride and ethoxy titanium trichloride.

Magnesium compounds can be selected from magnesium dihalide, alkoxy magnesium, alkyl magnesium, hydrate or alcohol adduct of magnesium dihalide, and one of the derivatives formed by replacing a halogen atom of the magnesium dihalide molecular formula with alkoxyl or haloalkoxyl group, or their mixture. Preferred magnesium compounds are magnesium dihalide, alcohol adduct of magnesium dihalide, and alkoxy magnesium.

It should be particularly noted that, the magnesium compound is preferably dissolved in a solvent system containing organic epoxy compound and organic phosphorus compound, wherein the organic epoxy compound comprises aliphatic olefins, dienes, halogenated aliphatic olefins, oxides of dienes, glycidyl ethers and inner ethers, all of which have 2 to 8 carbon atoms. Some specific compounds are as follows: ethylene oxide, propylene oxide, epoxy butane, butadiene oxide, butadiene dioxide, epichlorohydrin, methyl glycidyl ether, diglycidyl ether, tetrahydrofuran; wherein the organic phosphorus compound comprises hydrocarbyl ester or halohydrocarbyl ester of orthophosphoric acid or phosphorous acid, specifically, such as, trimethyl orthophosphate, triethyl orthophosphate, tributyl orthophosphate, triphenyl orthophosphate, trimethyl phosphite, triethyl phosphite, tributyl phosphite, triphenylmethyl phosphite.

Magnesium compounds can also be dissolved in a solvent system containing organic alcohol compounds, which are monohydric alcohols with carbon atoms of 2 to 8.

Different methods can be choosed to prepare the catalyst component according to the present invention. In the following several preparation methods are listed, but it would not restrict the preparation method for the solid catalyst component according to the invention in any way.

Method 1: preparing the catalyst component according to CN1506384.

First, magnesium compound and organic alcohol compound with a molar ratio of 2 to 5 are mixed with inert solvent; the temperature is increased to 120 to 150° C., and then phthalic anhydride and an organic silicon compound with a magnesium/ anhydride molar ratio of 5 to 10 and a magnesium/silicon molar ratio of 20 to 50 are added; after reacting for 1 to 5 h, an alcohol adduct is obtained.

Next, the alcohol adduct which has been cooled to room temperature is added into a solution of titanium compound which is pre-cooled to a temperature of −15 to −40° C., with a titanium/magnesium molar ratio of 20 to 50. The temperature is increased to 90 to 110° C., and then a diol diester compound as shown in Formula (I) with a magnesium/ester molar ratio of 2 to 10 is added. After reacting at a temperature of 100 to 130° C. for 1 to 3 h, solid particulates are filtered and separated.

Then, the solid particulates are added into a solution of titanium compound with a titanium/magnesium molar ratio of 20 to 50. The mixture is reacted under stirring at a temperature of 100 to 130° C. for 1.5 to 3 h, and the solid particulates are filtered and separated.

Finally, an inert solvent at a temperature of 50 to 80° C. is used to wash the solid particulates, and then the catalyst component is obtained after drying.

Method 2: preparing the catalyst component according to CN85100997.

First, magnesium compound is dissolved in a solvent system comprising organic epoxy compound, organic phosphorus compound and inert solvent. After a uniform solution is formed, the solution is mixed with titanium compound, and solids are precipitated at the presence of coprecipitation agent. Such solids are treated with the diol diester compound as shown in Formula (I) so that said diol diester compound is loaded on the solids; if necessary, titanium tetrahalide and inert diluent are used to further treat the solids. Coprecipitation agent can be one of organic acid anhydride, organic acid, ether, ketone and ester, or their mixtures, and some specific coprecipitation agents are as follows: acetic anhydride, phthalic anhydride, succinic anhydride, maleic anhydride, pyromellitic dianhydride, acetic acid, propionic acid, butyric acid, acrylic acid, methacrylic acid, acetone, methyl ethyl ketone, diphenyl ketone, methyl ether, ethyl ether, propyl ether, butyl ether, amyl ether, succinate, malonate, glutarate, 2,4-pentanediol diester, 3,5-heptanediol diester, and so on.

The amount of each said component is calculated by each molar of magnesium halide, wherein organic epoxy compound is from 0.2 to 10 molar, organic phosphorus compound is from 0.1 to 3 molar, coprecipitation agent is from 0 to 1.0 molar, titanium compound is from 0.5 to 150 molar, and the dilo ester compound with Formula (I) is from 0.02 to 0.5 molar.

Method 3: preparing the catalyst component according to CN1091748.

Spheres of magnesium chloride alcohol adduct are dispersed by high speed stirring in a dispersant system of white oil and silicone oil, and an emulsion is formed. Then the emulsion is unloaded into coolant so as to be cooled and setted rapidly, and microspheres of magnesium chloride alcohol adduct are formed. The coolant is inert hydrocarbon solvent with lower boiling point, such as petroleum ether, pentane, hexane, heptane, and so on. The microspheres of magnesium chloride alcohol adduct obtained are spherical carriers after being washed and dried. The molar ratio of alcohol to magnesium chloride is from 2 to 3, preferably 2 to 2.5. The diameter of carriers is from 10 to 300 µm, preferably 30 to 150 µm.

Excess amount of titanium tetrachloride is used to treat the above spherical carriers at low temperature. Temperature is increased gradually, and electron donor is added during the treatment. After treatment, spherical carriers are washed with inert solvent for several times, and a solid powdered spherical catalyst is obtained after drying. The molar ratio of titanium tetrachloride to magnesium chloride is from 20 to 200, preferably 30 to 60. The onset treatment temperature is from −30 to 0° C., preferably −25 to −20° C. The final treatment temperature is from 80 to 136° C., preferably 100 to 130° C.

The obtained spherical catalyst has the following characteristics: the content of titanium is from 1.5 to 3.0 wt %, the content of ester is from 6.0 to 20.0 wt %, the content of chloride is from 52 to 60 wt %, the content of magnesium is from 10 to 20 wt %, the content of inert solvent is from 1 to 6 wt %, and the specific surface area of catalyst is greater than 250 m$^2$/g.

Method 4: Titanium tetrechloride (TiCl$_4$) or a solution of titanium tetrechloride (TiCl$_4$) in arene is used to halogenate magnesium compound, such as dialkoxymagnesium and diaryloxymagnesium. The treatment with titanium tetrachloride (TiCl$_4$) or the solution of titanium tetrachloride (TiCl$_4$) in arene can be repeated for one or more times, and said diol diester is added therein during the one or more times of such treatment.

Method 5: preparing the catalyst component according to U.S. Pat. No. 4,540,697.

Transition metal compound (preferably tetravalent titanium compound), alkoxymagnesium compound and electron donor react with each other in a certain proportion in inert solvent, wherein the molar ratio of transition metal element to magnesium element is at least 0.5:1, and the amount of electron donor is at most 1.0 mol for each gram of titanium atom. The inert solvent should be removed conveniently, and dehydrated and deoxidated, and be removed from the gas that would enable catalyst being poisoned. The reaction is carried out at a temperature of −10 to 170° C., and the reaction time is from several minutes to several hours.

The methods for preparing catalyst component further include that, for example, adding magnesium compound and electron donor, etc. in the diluent to form emulsion, adding titanium compound for fixation to obtain spherical solids, and then obtaining a solid catalyst component after treatment.

Another object of the invention is to provide a catalyst for olefin polymerization, comprising a reaction product of the following components:

(1) the above solid catalyst component,
(2) alkyl aluminium compound, and
(3) optionally, external electron donor component;

wherein alkyl aluminium compound is the compound with a Formula of AlR$_n$X$_{3-n}$, in which R is hydrogen or hydrocarbyl group having 1 to 20 carbon atoms, X is halogen, and n is a value satisfying $1 \leq n \leq 3$. Specifically, the compound can be selected from triethyl aluminium, tripropyl aluminium, tri(n-butyl)aluminum, tri(isobutyl)aluminium, tri(n-octyl)aluminium, tri(isooctyl)aluminium, diethyl aluminium hydride, di(isobutyl)aluminium hydride, diethyl aluminium chloride, di(isobutyl)aluminium chloride, ethyl aluminum sesquichloride and ethyl aluminium dichloride, and preferably triethyl aluminium and tri(isobutyl)aluminium.

As to olefin polymer requiring a very high stereoregularity, it needs to add the external electron donor compound as mentioned in component (3), such as an organosilicon compound with a Formula of R$_n$Si(OR')$_{4-n}$, in which $0 \leq n \leq 3$, and R and R', which may be identical to or different from each other, can be selected from alkyl, cycloalkyl, aryl, halogenated alkyl and amine group, and R can be also halogen or hydrogen atom. For example, they can be selected from trimethyl methoxy silane, trimethyl ethoxy silane, dimethyl dimethoxy silane, dimethyl diethoxy silane, diphenyl dimethoxy silane, diphenyl diethoxy silane, phenyl triethoxy silane, phenyl trimethoxy silane, vinyl trimethoxy silane, cyclohexyl methyl dimethoxy silane and methyl t-butyl dimethoxy silane, preferably cyclohexyl methyl dimethoxy silane and diphenyl dimethoxy silane. As the external electron donor compound, it also can be the ether compound having electron donor group, such as ether compound like 1,3-diether, and /or amino silane compound.

The ratio of component (1) to component (2) to component (3), caculated as the molar ratio of titanium: aluminium: silicon, is in the range of 1:5-1000:0-500.

The catalyst of the present invention can be added directly into the reactor for polymerization process. Alternatively, prepolymerization can be conducted with catalyst before the catalyst is added into the first reactor. In the present invention, the term "prepolymerization" refers to polymerization with a low conversion degree. According to the present invention, said prepolymerization catalyst comprises the above solid catalyst and the prepolymer obtained by the prepolymerization of catalyst and olefin, and the prepolymerization multiples is in the range of 0.1 to 1000 g olefin polymer per 1 g solid catalyst component.

The α-olifin which is the same as the foregoing olefin can be used for prepolymerization, wherein the olefin for prepolymerization is preferably ethylene or propylene. Specifically, the mixture of ethylene or propylene and one or more α-olefins with a maximum amount of 20 mol % is particularly advantageous for prepolymerization. Preferably, the conversion degree of prepolymerization catalyst component is in a range of about 0.2 to about 800g polymer per 1 g catalyst component.

The prepolymerization process can be carried out at a temperature of −40 to 80° C., preferably −20 to 50° C., in liquid or gas phase. The prepolymerization step can be carried out on-line as a part of continuous polymerization process, or independently in intermittent operations. In order to prepare the polymer with an amount of 0.5 to 20 g per 1 g catalyst component, intermittent prepolymerization of the catalyst according to the present invention and propylene is particularly preferred. The polymerization pressure is from 0.01 to 10 MPa.

The catalyst according to the present invention can be also used to produce polyethylene, and copolymer of ethylene with α-olifin, such as propylene, butylene, pentene, hexene, octene, and 4-methyl-1-pentene.

It should be noted that in the present invention, by using the catalyst component containing a certain amount of diol diester compound with Fischer projection formula as Formula (II), the activity and stereotactic ability of the catalyst, especially the isotactic index indicated by boiling n-heptane extracted insolubles in the production of polymers with high melt index, are enhanced significantly. At the same time, the hydrogen response of the catalyst is also good, and the molecular weight distribution of the polymer obtained is also wider, all of which is favour for the development of polymers with different MK.

Embodiments

The present invention will be explained in detail by the following examples. Obviously, these examples do not restrict the scope of the present invention in any manner.

Test methods:
1. Measurement of nuclear magnetic resonance: using Bruke dmx300 nuclear magnetic resonance spectrometer for $^1$H-NMR (300 MHz, solvent is $CDCl_3$, TMS as internal standard, and measuring temperature is 300 K);
2. Isotactic index of polymer is measured by heptane extraction method (heptane boiling extraction for 6 h): 2 g dried polymer sample is extracted with boiling heptane in an extractor for 6 hours, then the residul substance is dried to constant weight, and the ratio of the weight (g) of residual polymer to 2 is namely the Isotactic Index;
3. Liquid chromatography is a Waters-600E high performance liquid chromatography with C-18 column, and the column temperature is 30° C. The mobile phase is methol-water with a flow rate of 1.0 ml/min. UV detector, observed at 229 nm.

a) Synthesis of Diol Diester Compound

The diol with polarimetry activity can be synthesized as disclosed in "Chemistry Letters, 1979, 1049-1050", and then is reacted with corresponding acid or acyl chloride, so that a corresponding diol diester with polarimetry activity can be obtained. It can also be obtained by crystallizing while lowering temperature of the diol mixture in organic solvent such as ether, then reacting with corresponding acid or acyl chloride, see "Bull. Chem. Soc. Jpn., 1980, (53), 3367-3368". Additionally, the diol diester with different conformation isomers can be dissolved in organic solvent like toluene, and then a very pure mixture of the mesomer, levo isomer and dextro isomer can be obtained after several times of recrystallizations by lowering temperature and crystallizing slowly. It should be stated that, as the operation conditions, such as the solvent, reaction temperature, reductant or alkali used in synthesis are different, the proportions of different conformation isomers in the primary diol diester are very different from each other.

1. Preparation of Product, Which is Mainly (2R,4R)-pentanediol dibenzoate (Other Compounds With R Configuration can Also be Similarly Synthesized)

20 g (R,R)—Ta (tartaric acid) and 200 g NaBr are dissloved in 2000 ml deionized water, then NaOH solution is used to adjust the pH of the solution to 3.2 (solution A). It should be noted that for the product mainly being (2S,4S)-pentanediol dibenzoate, (R, R)—Ta should be replaced with (S,S)—Ta; and other compounds with S configuration can also be similarly synthesized. Into the solution 16g Raney Ni is added under stirring, and the solution is heated for 1 h at the temperature of 100° C. After cooling, the solution is thrown away, and then the residue is washed with 200 ml deionized water to obtain a product. The product obtained is treated repeatedly in solution A twice, and washed with methol and dried, then the catalyst (R,R)—Ta—NaBr-Raney Ni is obtained.

Into a 100 ml stainless steel autoclave, 10 g (0.1 mol) 2,4-pentane dione, 0.2 ml acetic acid, 22 ml THF being removed from water, and 0.065 mol catalyst (R,R)—Ta—NaBr-Raney Ni are added, and hydrogen is fed in until the pressure is 9.3 Mpa, then the mixture is heated to 100° C. The temperature is maintained until the hydrogen pressure in the autoclave is no longer decreased. Then the reaction is over. After the pressure releases, the mixture is filtered. After removal of solvent in filtration, crude product is obtained. With reduced pressure distillation, the product is collected at the temperature between 130 and 132° C. and under the pressure of 3 KPa. The yield is 91%.

0.05 mol (5.1 g) of the above-mentioned product is added into 200 ml THF, with 0.1 mol pyridine being added under stirring and 0.1 mol benzoyl chloride being added dropwise, then a heat-reflux is carried out for 4 h. After cooling, the mixture is dissolved by adding saturated aqueous solution of sodium chloride, then extracted with ethyl acetate. After removal of solvent in the organic layer, column chromatography is carried out with petroleum ether as eluent, then 13.5 g white solid is obtained. The yield is 87%.

The white solid is analysized by liquid chromatogram. Result shows that there are mainly two peaks. The retention time of one peak is 10.122, and the peak area thereof is 90%; the corresponding product is (2R,4R)-pentanediol dibenzoate. The retention time of the other peak is 12.118, and the peak area thereof is 10%; the corresponding product is meso-2,4-pentanediol dibenzoate.

2. Preparation of meso-2,4-pentanediol dibenzoate
(1) Synthesis of 2,4-pentanediol dibenzoate Mixture (see CN1580034A)

A mixture of 10 g 2,4-pentanedione and 30 ml methol is added into a mixed solution of 2.5 g sodium borohydride, 0.1 g sodium hydroxide and 25 ml water at a temperature of 0 to 10° C. After that, the solvent is removed under reduced pressure, and then a continuous extraction is carried out for 15 h with 40 ml ethyl acetate. The solvent is removed, and after column chromatography, a colourless liquid of 9.4 g 2,4-pentanediol is obtained. The yield is 90%. In the IR spectrogram, a strong absorption peak is observed at 3400 cm$^{-1}$, and no absorption peak is observed at 1700 cm$^{-1}$, which means that the reduction reaction is carried out completely.

Into 3.1 g (0.03 mol) 2,4-pentanediol, 30 ml THF and 7.1 g (0.09 mol) pyridine are added, and 10.5 g (0.075 mol) benzoyl chloride is added under stirring, then a heat-reflux is carried out for 4 h. After cooling, 20 ml saturated salt solution is added, then extraction is carried out with ethyl acetate, and after drying with anhydrous $NaSO_4$, the solvent is removed. A colourless liquid of 8.9 g 2,4-pentanediol dibenzoate is obtained by column chromatography. The yield is 95%.
(2) Separation of meso-2,4-pentanediol dibenzoate From the Mixture 20 g mixture of 2,4-pentanediol dibenzoate isomers prepared as above is dissolved in 20 ml toluene. With the temperature being lowered slowly, white crystals are precipitated slowly in the solution. The crystals are separated, and recrystallized in toluene for several times. The liquid chromatogram of the obtained crystals reveals that, the retention time is 12.108, and the peak area is 99.0%.

Meso-2,4-pentanediol dibenzoate, $^1$H-NMR (TMS, $CDCl_3$, ppm): δ 1.40-1.42 (6H, d, $CH_3$), δ 1.87-1.95 (1H, m, $CH_2$), δ 2.29-2.39 (1H, m, $CH_2$), 6 5.28-5.39 (2H, m, CH of ester), δ 7.38-8.04 (10H, m, $C_6H_6$).

(2R,4R)-pentanediol dibenzoate and (2S,4S)-pentanediol dibenzoate, $^1$H-NMR (TMS, $CDCl_3$, ppm): δ 1.40-1.42 (6H, d, $CH_3$), δ 2.08-2.12 (2H, t, $CH_2$), δ 5.26-5.37 (2H, m, CH of ester), δ 7.35-7.99 (10H, m, $C_6H_6$).

The diol diester added in the preparation of catalyst meets the requirements in the following examples by adjustment of the amount of each purer isomer obtained by the above processes. The adding method of the diol diester is conventional in chemistry: weighing out each isomer (such as levo-, dextro- and meso-2,4-pentanediol dibenzoate) according to a certain proportion, and after mixing, adding the mixture to prepare catalyst; analysising the content of each isomer in the prepared catalyst; if the content of each isomer in the catalyst does not meet the requirement, changing the adding proportion of isomers as appropriate, but keeping the total amount unchanged. The analysis for the electron donor content in the catalyst comprises the following steps: carrier destruction by dilute hydrochloric acid, extraction of electron donor by ethyl acetate, and analysis by liquid chromatogram.

b) Preparation of Solid Catalyst Component

Preparation Method A of Solid Catalyst Component

Preparation method A corresponds to Method 1 of said solid catalyst component as mentioned above. Under nitrogen atmosphere, 4.8 g anhydrous magnesium chloride, 19.5 g isooctyl alcohol, and 19.5 g decane as solvent are added into a 500 ml reactor which is provided with stirrers. Being heated to 130° C., the reaction is carried out for 1.5 h until magnesium chloride is dissolved completely. Then 1.1 g phthalic anhydride is added, and the reaction is continued for 1 h with the temperature kept at 130° C. Alcohol adduct is obtained and then it is cooled to room temperature.

Under nitrogen atmosphere, the above alcohol adduct is added dropwise into 120 ml solution of titanium tetrachloride which is pre-cooled to −22° C. Being heated to 100° C. slowly, 10 mmol diol diester compound is added. Then, being heated to 110° C. which is kept for 2 h, the mixture is filtered while hot. Another 120 ml solution of titanium tetrachloride is added, and then the reaction is carried out for 1 h after being heated to 110° C. After filtration, the solid particulates are washed with anhydrous hexane for 4 times and then dried. Then a solid catalyst component is obtained.

Preparation Method B of Solid Catalyst Component

Preparation method B corresponds to Method 2 of said solid catalyst component as mentioned above. Into the reactor, in which air is fully replaced by high purity nitrogen, 6.0 g magnesium chloride, 119 ml toluene, 5 ml epichlorohydrin and 15.6 ml tributyl phosphate (TBP) are added in sequence. Being heated to 50° C. under stirring and the temperature being kept for 2.5 h, the solid is dissolved completely. Then 1.7 g phthalic anhydride is added, and the temperature is further kept for 1 h. After cooling the solution to below −25° C., 70 ml $TiCl_4$ is added dropwise within 1 h. The temperature is slowly increased to 80° C., during which the solid is precipitated slowly. 6 mmol diol diester compound is added, and the temperature is kept for 1 h. After filtration, 80 ml toluene is added, then solid precipitate is obtained after being washed twice.

Then 60 ml toluene and 40 ml $TiCl_4$ are added. Being heated to 100° C., the treatment is carried out for 2 h and the filtrate is exhausted. After repeating the above operation for one time, another 60 ml toluene is added, and the filter residual is washed for 3 times in boiling state. Then 60 ml hexane is added, and the filter residual is washed for 2 times in boiling state. Then another 60 ml hexane is added, and the filter residual is washed for 2 times at room temperature. The catalyst component is obtained.

Preparation Method C of Solid Catalyst Component

Preparation method C corresponds to Method 3 of said solid catalyst component as mentioned above. In a 250 ml reactor, which is provided with a reflux condenser, a mechanical stirrer and a thermometer, and in which air is fully replaced by nitrogen, 36.5 ml anhydrous ethanol and 21.3 g anhydrous magnesium chloride are added. Under heating and stirring, after magnesium chloride dissolved completely, 75 ml white oil and 75 ml silicone oil are added, and the temperature is kept at 120° C. for a certain time. In another 500 ml reactor equipped with high speed stirrers, 112.5 ml white oil and 112.5 ml silicone oil are added in advance, and it is preheated to 120° C. The above mixture is fed rapidly into the second reactor, and a stirring is carried out at a speed of 3500 rmp for 3 min with the temperature kept at 120° C. Under stirring, the materials are transferred into a third reactor which is cooled to −25° C. and filled with 1600 ml hexane in advance. Until the transfer of materials is completed, the final temperature is no more than 0° C. After vacuum filtration, the filter residual is washed with hexane and dried under vacuum, obtaining 41 g spherical particulates magnesium chloride alcohol adduct. The carrier with 100 to 400 mesh is selected after sieving, and the ingredient of the carrier is $MgCl_2 \cdot 2.38 C_2H_5OH$ by analysis and test.

7 g above spherical carrier of $MgCl_2 \cdot 2.38 C_2H_5OH$ is added slowly into a reactor which contains 150 ml $TiCl_4$ and is pre-cooled to −20° C. After being slowly heated to 40° C., 5 mmol diol diester compound is added. After continuously being heated until 130° C. and the temperature being kept for 2 h, vacuum filtration is carried out. Another 120 ml $TiCl_4$ is added. After being slowly heated to 130° C. and the temperature being kept for 2 h, washing is carried out with 60 ml hexane for several times, until no chloridion is observed in the filtration. The filter cake is dried under vacuum, obtaining the solid catalyst component.

c) Test of Polymerization of Propylene

The catalyst components of the above examples are used to polymerize propylene respectively. The propylene polymerization process is as follows. Into a 5L stainless steel reactor in which air is replaced fully with gas propylene, 2.5 mmol $AlEt_3$ and 0.1 mmol cyclohexyl methyl dimethoxy silane (CHMMS) are added, then 8 to 10 mg catalyst component of as above and 1.2L hydrogen are added, after feeding 2.3L liquid propylene, the temperature is increased to 70° C. and kept for 1 h. After cooling and pressure release, PP powders of Examples 1 to 10 and Comparative Examples 1 to 5 are obtained.

TABLE 1

Results of propylene polymerization

| Num. | Electron donor | Preparation process for catalyst | Fischer projection formula(II) content wt % | Polymerization activity kgPP/gcat | Isotactic index % |
|---|---|---|---|---|---|
| Example 1 | 2,4-pentanediol dibenzoate | A | 35.0 | 35.1 | 98.1 |
| Example 2 | 2,4-pentanediol dibenzoate | A | 51.0 | 39.5 | 98.8 |
| Example 3 | 2,4-pentanediol dibenzoate | A | 95.1 | 42.3 | 98.9 |

TABLE1-continued

Results of propylene polymerization

| Num. | Electron donor | Preparation process for catalyst | Fischer projection formula(II) content wt % | Polymerization activity kgPP/gcat | Isotactic index % |
|---|---|---|---|---|---|
| Comparative Example 1* | 2,4-pentanediol dibenzoate | A | 0 | 17.6 | 92.1 |
| Comparative Example 2* | 2,4-pentanediol dibenzoate | A | 0 | 17.0 | 91.9 |
| Comparative Example 3 | 2,4-pentanediol dibenzoate | A | 20.5 | 26.3 | 97.0 |
| Example 4 | 3,5-heptanediol dibenzoate | B | 98.9 | 59.6 | 98.6 |
| Comparative Example 4* | 3,5-heptanediol dibenzoate | B | 0 | 17.9 | 89.3 |
| Example 5 | 3,5-heptanediol di(p-methylbenzoate) | B | 96.9 | 60.5 | 98.8 |
| Example 6 | 4-ethyl-3,5-heptanediol dibenzoate | B | 96.5 | 61.8 | 97.9 |
| Example 7 | 2,4-pentanediol di(p-chlorobenzoate) | B | 60.0 | 51.2 | 98.5 |
| Example 8 | 2,4-pentanediol dibenzoate | C | 81.0 | 67.6 | 99.1 |
| Example 9 | 3,5-heptanediol di(p-butylbenzoate) | A | 82.4 | 45.2 | 98.6 |
| Example 10 | 6-methyl-2,4-heptanediol di(p-butyl benzoate) | A | 78.6 | 42.9 | 97.8 |
| Comparative example 5 | 6-methyl-2,4-heptanediol di(p-butyl benzoate) | A | 25.0 | 22.8 | 95.3 |

Note:
In the catalyst preparation of comparative examples 1*, 2* and 4*, levo isomer, racemate and dextro isomer are added respectively. In other comparative examples and examples, besides diol diester with Fischer projection formula (II), other diol diester compounds can be levo isomer, dextro isomer or mixture thereof.

It can be seen from Table 1 that, when the content of diol diester with Fischer projection formula (II) is from 35 to 96.9 wt %, the catalyst activity is from 35.1 to 67.6 kgPP/gcat, and the isotactic index is from 97.8 to 99.1%; when the content of diol diester with Fischer projection formula (II) is from 0 to 25.0 wt %, the catalyst activity is from 17.0 to 26.3 kgPP/gcat, and the isotactic index is from 89.3 to 97.0%. Therefore, only when the content of diol diester with Fischer projection formula (II) is greater than 35 wt %, the catalyst has good performances, and when the content is greater than 51%, the catalyst has excellent comprehensive properties.

The catalysts used in the above Examples and Comparative Examples are used to polymerize propylene. The conditions are the same as the foregoing polymerization reactions, except the amount of hydrogen added is changed from 1.2 L to 8.0L. The results are shown in Table 2.

TABLE 2

Effect of the content of Fischer projection formula (II) on the isotactic index of PP under high hydrogen concentration

| catalyst | Fischer projection formula (II) content wt % | Polymerization activity (kgPP/gcat) | | Melt index (g/10 min) | | Isotactic index (%) | |
|---|---|---|---|---|---|---|---|
| | | 1.2 L hydrogen | 8 L hydrogen | 1.2 L hydrogen | 8 L hydrogen | 1.2 L hydrogen | 8 L hydrogen |
| Example 1 | 35.0 | 35.1 | 43.5 | 0.8 | 21.3 | 98.1 | 96.0 |
| Example 2 | 51.0 | 39.5 | 46.8 | 0.6 | 20.9 | 98.8 | 97.6 |
| Comparative example 3 | 20.5 | 26.3 | 28.9 | 1.0 | 25.5 | 97.0 | 91.9 |

It can be seen from Table 2 that, the content of diol diester with Fischer projection formula (II) has a great influence on the isotactic index of the obtained polymer under high hydrogen concentration; only when the content of diol diester with Fischer projection formula (II) is greater than or equal to 35 wt %, it is ensured that the polymer can still have a high isotactic index under a high melt index (greater than 95%).

During the preparation of catalyst component, other electron donors can be introduced. Through complex formulation of such electron donor and the diol diester with the content of diol diester with Fischer projection formula (II) greater than or equal to 35 wt %, catalyst with high activity can be prepared. The particular can be found in the following Examples.

Example 11

Example 11 is similar to Example 4. However, in Example 4 "60 ml toluene and 40 ml TiCl$_4$ are added, being heated to 100° C., the treatment is carried out for 2 h and the filtrate is exhausted, then repeating the above operation for one time"; but in Example 11 "0.2 mmol di(n-butyl)phthalate, 60 ml toluene and 40 ml TiCl$_4$ are added, being heated to 110° C., the treatment is carried out for 2 h and the filtrate is exhausted". Then the treatment with 60 ml toluene and 40 ml TiCl$_4$ for 0.5 h under 110° C. is repeated for three times. The obtained catalyst contains 7.9% 3,5-heptanediol dibenzoate, in which the mesomer content is 97.9%, and 0.9% di(n-butyl) phthalate. The catalyst activity is 68.6 kgPP/g cat., and the isotactic index of polymer is 98.8%.

With 9.6L hydrogen added, the melt index of the obtained polymer is 59.6 g/10 min, and the isotactic index thereof is 95.8%.

Example 12

Example 12 is similar to Example 6. However, in Example 12 0.4 mmol 2-isopropyl-2-isopentyl-1,3-dimethoxyl propane is also added at the first adding of 60 ml toluene and 40 ml TiCl$_4$. The obtained catalyst contains 12.1% 4-ethyl-3,5-heptanediol dibenzoate, in which the mesomer content is 96.9%, and 2.8% 2-isopropyl-2-isopentyl-1,3-dimethoxyl propane. The catalyst activity is 69.1 kgPP/gcat, and the isotactic index of polymer is 98.9%.

With hydrogen 9.6L added, the melt index of the obtained polymer is 71.5 g/10 min, and the isotactic index of the obtained polymer is 95.5%.

Example 13

Example 13 is similar to Example 4. However, 6 mmol diol diester is added in Example 4, while 3 mmol diol diester and 3 mmol 9,9-di(methoxymethyl)fluorene are added in Example 13. The obtained catalyst contains 5.2% 3,5-heptanediol dibenzoate, in which the mesomer content is 98.9%, and 5.3% 9,9-di(methoxymethyl)fluorene. The catalyst activity is 75.9 kgPP/gcat, and the isotactic index of polymer is 98.8%.

It can be seen from the above examples that, by the complex formulation of the diol diester compound with Fischer projection formula (II) structure and other inner electron donors, not only the catalyst activity is enhanced significantly, but also the isotactic index of the obtained polymer is further increased.

The foregoing examples are merely the preferred embodiments of the present invention. However, the protection scope of the present invention is not limited to the disclosure. One skilled in the art can easily make any changes or variation based on the disclosure of the present invention, and the changes or variations are within the protection scope of the present invention. Therefore, the protection scope of the present invention should be determined by the appended claims.

The invention claimed is:

1. A catalyst component for olefin polymerization, comprising:
magnesium, titanium, halogen, and a first electron donor, wherein the first electron donor comprises one or more diol diester compounds of Formula (I), wherein greater than or equal to 35 wt % of the first electron donor have a Fischer projection formula of Formula (II):

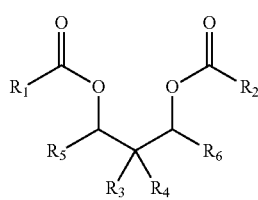

(I)

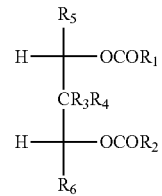

(II)

wherein in both Formula (I) and Formula (II):
R$_1$ and R$_2$ are identical or different, and are selected from the group consisting of (C$_3$-C$_{20}$)cycloalkyl, (C$_6$-C$_{20}$) aryl, (C$_7$-C$_{20}$)alkaryl, (C$_7$-C$_{20}$)aralkyl, and derivatives of (C$_3$-C$_{20}$)cycloalkyl, (C$_6$-C$_{20}$)aryl, (C$_7$-C$_{20}$)alkaryl, (C$_7$-C$_{20}$)aralkyl having one or more hydrogen atoms substituted by halogen atoms, provided that R$_1$ and R$_2$ are not (C$_3$-C$_{20}$)cycloalkyl simultaneously;
R$_3$ and R$_4$ are identical or different, and are selected from the group consisting hydrogen atom, halogen atom, (C$_1$-C$_{10}$) straight chain alkyl, (C$_3$-C$_{10}$) branched chain alkyl, (C$_3$-C$_{10}$)cycloalkyl, (C$_6$-C$_{10}$)aryl, (C$_7$-C$_{10}$)alkaryl, and (C$_7$-C$_{10}$)aralkyl, wherein optionally R$_3$ and R$_4$ are connected to form a ring; and
R$_5$ and R$_6$ are identical or different, and are selected from the group consisting of halogen atom, (C$_1$-C$_{10}$) straight chain alkyl, (C$_3$-C$_{10}$) branched chain alkyl, (C$_3$-C$_{10}$) cycloalkyl, (C$_6$-C$_{10}$)aryl, (C$_7$-C$_{10}$)alkaryl, and derivatives of (C$_7$-C$_{10}$)aralkyl, and (C$_3$-C$_{10}$)cycloalkyl, (C$_6$-C$_{10}$)aryl, (C$_7$-C$_{10}$)alkaryl, (C$_7$-C$_{10}$)aralkyl having one or more hydrogen atoms substituted by halogen atoms.

2. The catalyst component according to claim 1, wherein greater than or equal to 51 wt % of the first electron donor have the Fischer projection formula of Formula (II).

3. The catalyst component according to claim 1, wherein R$_1$ and R$_2$ independently selected from the group consisting of (C$_6$-C$_{20}$)aryl, (C$_7$-C$_{20}$)alkaryl, (C$_7$-C$_{20}$)aralkyl, phenyl, (C$_1$-C$_5$)alkyl phenyl, halogenatedI phenyl halogenated (C$_1$-C$_5$)alkyl phenyl, indenyl, benzyl, and phenethyl; and
wherein optionally one or more hydrogen in R$_1$ or R$_2$ are substituted by halogen.

4. The catalyst component according to claim 3, wherein R$_1$ and R$_2$ are identical.

5. The catalyst component according to claim 1, wherein R$_3$ and R$_4$ are independently selected from the group consisting of hydrogen, methyl, ethyl, n-propyl, isopropyl, n-butyl, isobutyl, chloro, and bromo.

6. The catalyst component according to claim 1, wherein R$_5$ and R$_6$ are independently selected from methyl, ethyl, n-propyl, isopropyl, n-butyl, isobutyl, and methyl, ethyl, n-propyl, isopropyl, n-butyl, isobutyl having one or more hydrogen substituted by halogen.

7. The catalyst component according to claim 1, wherein the diol diester compounds having the Fisher projection formula of Formula (II) are selected from the group consisting of:
meso-2,4-pentanediol dibenzoate,
meso-3-methyl-2,4-pentanediol dibenzoate,
meso-3-ethyl-2,4-pentanediol dibenzoate,
meso-3-propyl-2,4-pentanediol dibenzoate,
meso-3-butyl-2,4-pentanediol dibenzoate,
meso-3,3-dimethyl-2,4-pentanediol dibenzoate,
meso-2,4-pentanediol di(p-methylbenzoate),
meso-3-chloro-2,4-pentanediol dibenzoate,
meso-3-bromo-2,4-pentanediol dibenzoate, meso-2,4-pentanediol di(m-methylbenzoate),
meso-2,4-pentanediol di(o-methylbenzoate),
meso-2,4-pentanediol di(p-ethylbenzoate),
meso-2,4-pentanediol di(p-butylbenzoate),
meso-2,4-pentanediol di(p-chlorobenzoate),
meso-3,5-heptanediol dibenzoate,
meso-4-methyl-3,5-heptanediol dibenzoate,
meso-4-dimethyl-3,5-heptanediol dibenzoate,
meso-4-ethyl-3,5-heptanediol dibenzoate,
meso-4-propyl-3,5-heptanediol dibenzoate,
meso-4-butyl-3,5-heptanediol dibenzoate,
meso-4-chloro-3,5-heptanediol dibenzoate,
meso-4-bromo-3,5-heptanediol dibenzoate,
meso-3,5-heptanediol di(p-methylbenzoate),
meso-3,5-heptanediol di(o-methylbenzoate),
meso-3,5-heptanediol di(m-methylbenzoate),
meso-3,5-heptanediol di(p-ethylbenzoate),
meso-3,5-heptanediol di(p-butylbenzoate),
meso-3,5-heptanediol di(p-chlorobenzoate),
(2S,4R)-2,4-pentanediol benzoxy cinnamate,
(2S,4R)-3-methyl-2,4-pentanediol benzoxy cinnamate,
(2S,4R)-3-ethyl-2,4-pentanediol benzoxy cinnamate,
(2S,4R)-3-propyl-2,4-pentanediol benzoxy cinnamate,
(2S,4R)-3-butyl-2,4-pentanediol benzoxy cinnamate,
(2S,4R)-3,3-dimethyl-2,4-pentanediol benzoxy cinnamate,
(2S,4R)-3-chloro-2,4-pentanediol dibenzoate,
(3S,5R)-3,5-heptanediol benzoxy cinnamate,
(3S,5R)-4-methyl-3,5-heptanediol benzoxy cinnamate,
(3S,5R)-4,4-dimethyl-3,5-heptanediol benzoxy cinnamate,
(3S,5R)-4-ethyl-3,5-heptanediol benzoxy cinnamate,
(3S,5R)-4-propyl-3,5-heptanediol benzoxy cinnamate,
(3S,5R)-4-butyl-3,5-heptanediol benzoxy cinnamate,
(3S,5R)-4-chloro-3,5-heptanediol benzoxy cinnamate,
(2S,4R)-6-methyl-2,4-heptanediol dibenzoate,
(2S,4R)-6-methyl-2,4-heptanediol di(p-butyl benzoate),
(2R,4S)-2,4-pentanediol benzoxy cinnamate,
(2R,4S)-3-methyl-2,4-pentanediol benzoxy cinnamate,
(2R,4S)-3-ethyl-2,4-pentanediol benzoxy cinnamate,
(2R,4S)-3-propyl-2,4-pentanediol benzoxy cinnamate,
(2R,4S)-3-butyl-2,4-pentanediol benzoxy cinnamate,
(2R,4S)-3,3-dimethyl-2,4-pentanediol benzoxy cinnamate,
(2R,4S)-3-chloro-2,4-pentanediol dibenzoate,
(3R,5S)-3,5-heptanediol benzoxy cinnamate,
(3R,5S)-4-methyl-3,5-heptanediol benzoxy cinnamate,
(3R,5S)-4,4-dimethyl-3,5-heptanediol benzoxy cinnamate,
(3R,5S)-4-ethyl-3,5-heptanediol benzoxy cinnamate,
(3R,5S)-4-propyl-3,5-heptanediol benzoxy cinnamate,
(3R,5S)-4-butyl-3,5-heptanediol benzoxy cinnamate,
(3R,5S)-4-chloro-3,5-heptanediol benzoxy cinnamate,
(2R,4S)-6-methyl-2,4-heptanediol dibenzoate,
(2R,4S)-6-methyl-2,4-heptanediol di(p-butyl benzoate), or mixtures thereof.

8. The catalyst component according to claim 1, further comprising a second electron donor, wherein the second electron donor comprises one or more chosen from compounds of Formula (III) or phthalate diester compounds, and a molar ratio of the first electron donor and the second electron donor is from 1:0.01 to 1:100,

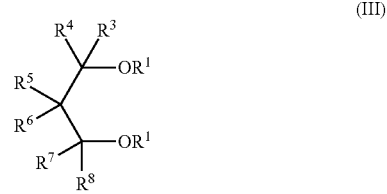

wherein in Formula (III), $R^1$ and $R^2$ are identical or different and are selected from the group consisting of straight chain $(C_1-C_{20})$alkyl, branched chain $(C_1-C_{20})$alkyl, straight chain $(C_3-C_{20})$cycloalkyl group, and branched chain $(C_3-C_{20})$cycloalkyl; wherein $R^3$ to $R^8$ are independently selected from the group consisting of hydrogen, halogen, straight chain $(C_1-C_{20})$alkyl, branched chain $(C_1-C_{20})$alkyl, $(C_3-C_{20})$cycloalkyl, $(C_6-C_{20})$aryl, and $(C_7-C_{20})$aralkyl, and wherein optionally two or more among $R^3$ to $R^8$ are connected to form one or more rings.

9. The catalyst component according to claim 8, wherein the molar ratio of the first electron donor to the second electron donor is from 1:0.02 to 1:5.

10. The catalyst component according to claim 1, obtained by reacting a magnesium compound, a titanium compound with the first electron donor, wherein the titanium compound has a formula of $TiX(OR)_{4-n}$, in which R is a hydrocarbyl group having 1 to 20 carbon atoms, X is halogen, and n=0-4, and wherein the magnesium compound is selected from the group consisting of a magnesium dihalide, an alkoxymagnesium, an alkyl magnesium, a hydrate adduct of magnesium dihalide, an alcohol adduct of magnesium dihalide, and derivatives formed by replacing a halogen atom of the magnesium dihalide with an alkoxyl group or a haloalkoxyl group.

11. The catalyst component according to claim 10, wherein the magnesium compound is dissolved in a solvent system containing an organic alcohol compound.

12. The catalyst component according to claim 11, wherein the organic alcohol compound is a monohydric alcohol with 2 to 8 carbon atoms.

13. The catalyst component according to claim 10, wherein the magnesium compound is an alcohol adduct of magnesium dihalide.

14. The catalyst component according to claim 10, wherein the magnesium compound is dissolved in a solvent system containing an organic epoxy compound and an organic phosphorus compound, in which the organic epoxy compound is selected from the group consisting of aliphatic olefins, dienes, halogenated aliphatic olefins, oxides of dienes, glycidyl ethers, inner ethers, all of which having 2 to 8 carbon atoms, and organic phosphorus compounds that are hydrocarbyl esters or halogenated hydrocarbyl esters of an orthophosphoric acid or a phosphorous acid.

15. A catalyst for olefin polymerization, comprising:
1) the catalyst component according to claim 1,
2) an alkyl aluminium compound,
3) optionally, an external electron donor component.

16. The catalyst according to claim 15, wherein the external electron donor compound has a formula of $R_nSi(OR')_{4-n}$, wherein $0 \le n \le 3$, wherein R and R' are identical to or different wherein R' is an alkyl, a cycloalkyl, an aryl, a halogenated alkyl, or an amine and wherein R is an alkyl, a cycloalkyl, an aryl, a halogenated alkyl, an amine, a halogen, or hydorgen.

17. A prepolymerization catalyst for olefin polymerization, comprising a solid catalyst according to claim 15 and a prepolymer obtained by prepolymerization of the solid catalyst according to claim 15 and an olefin, the prepolymerization multiples being in the range of 0.1 to 1000 gram of the olefin per gram of the solid catalyst component.

18. The prepolymerization catalyst according to claim 17, wherein the olefin is ethylene or propylene.

19. A process for olefin polymerization carried out in the presence of a catalyst according to claim 15.

20. A process for olefin polymerization carried out in the presence of a prepolymerization catalyst according to claim 18.

21. The catalyst component according to claim 1, wherein greater than or equal to 60 wt % of the first electron donor have the Fischer projection formula of Formula (II).

22. The catalyst component according to claim 1, wherein greater than or equal to 80 wt % of the first electron donor have the Fischer projection formula of Formula (II).

* * * * *